Jan. 17, 1967  R. H. POTTS  3,299,117
STEPWISE PREPARATION OF FATTY ACID NITRILES
Filed March 25, 1966
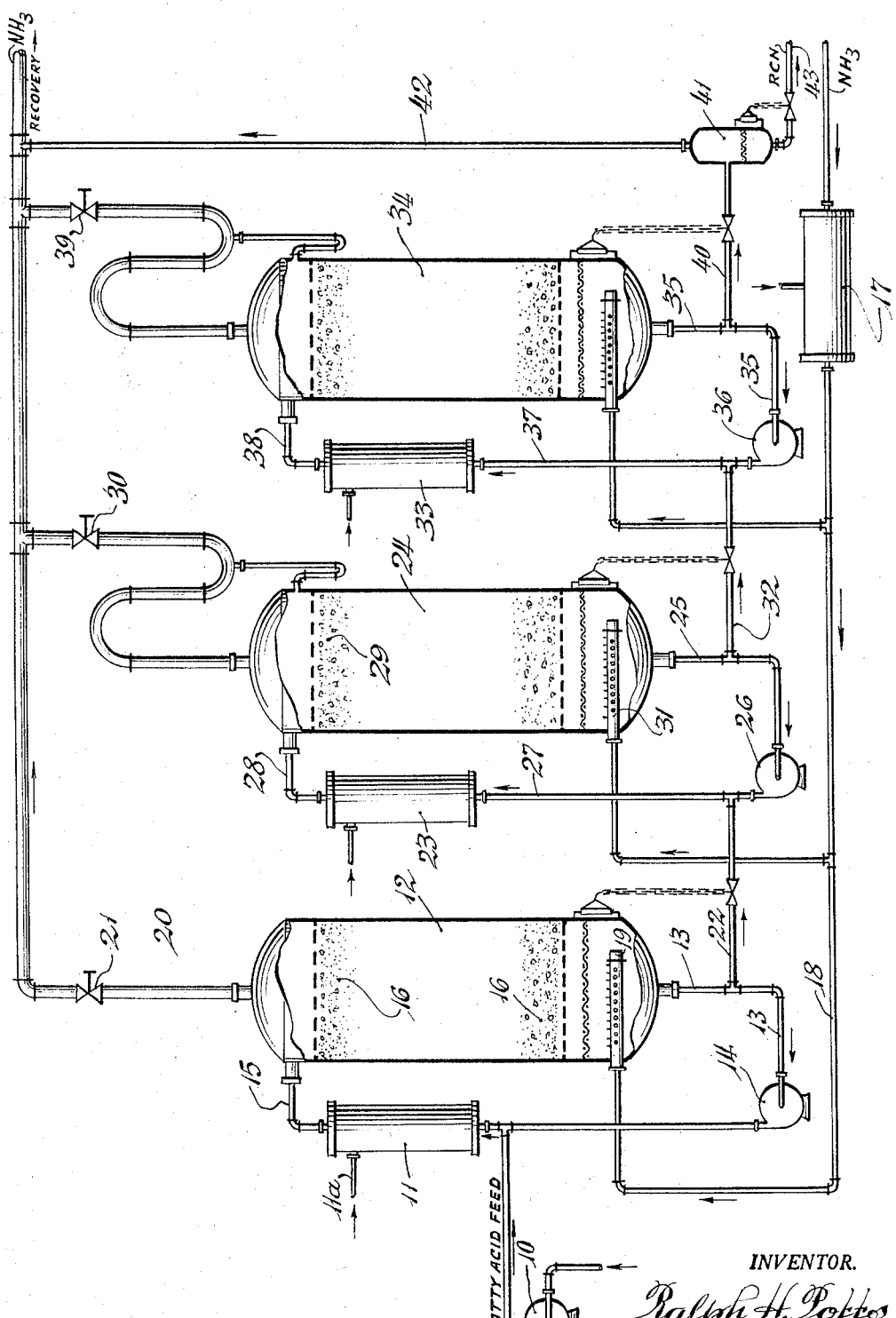
INVENTOR.
Ralph H. Potts
By Carl C. Batz
Attorney.

United States Patent Office 3,299,117
Patented Jan. 17, 1967

3,299,117
STEPWISE PREPARATION OF FATTY
ACID NITRILES
Ralph H. Potts, La Grange, Ill., assignor to Armour and
Company, Chicago, Ill., a corporation of Delaware
Filed Mar. 25, 1966, Ser. No. 544,642
4 Claims. (Cl. 260—465.2)

This invention relates to the preparation of nitriles, and more particularly to a process in which fatty acids are converted into nitriles through a series of reactions while being maintained in liquid phase.

This application is a continuation-in-part of my copending application Ser. No. 403,692, filed Oct. 5, 1964, now abandoned, which application, in turn, was a continuation in part of my application Ser. No. 104,952, filed April 24, 1961, now abandoned.

While an early patent to Ralston, No. 2,061,314, described a liquid phase operation for converting fatty acids, amides, esters, etc., into their corresponding nitriles, the operation was carried on in a single converter at atmospheric pressure, and as the temperature was increased, the low-boiling acids vaporized from the reaction zone and it was necessary to apply reflux condensers and catalyst chambers to prevent high melting acids and amides from setting up in the reflux condensing system.

Because of such difficulties, the practice has developed of using a combination of liquid phase and vapor phase reactions, the entire charge being vaporized at one point or another and the vapors subjected to reactions in contact with ammonia, and such combined liquid phase and vapor phase processes have become the established commercial operations.

While the combined liquid phase and vapor phase processes have been successfully operated to produce large amounts of nitriles, there are several inherent disadvantages in them which may be set out as follows:

(1) The temperatures required for vaporization are higher than those required for conversion in liquid phase.

(2) To reduce vaporization temperature, high ratios of ammonia are used, requiring larger ammonia recovery equipment.

(3) The distillation temperature is high and undesirable by-products from the catalyst chamber are carried along, contaminating the product and making it necessary to perform a second distillation for many purposes.

(4) Materials having a molecular weight of 300 plus cannot be made economically in the present standard processes because too much ammonia is required for vaporization.

Since liquid phase reaction has the advantage of converting materials of high molecular weight into nitriles, and whereas a vapor phase system or a joint liquid and vapor system is limited to those materials which can be vaporized at temperatures below their decomposition points, a substantial advance could be achieved if it were possible to manufacture nitriles continuously in a series of steps at which pressures and temperatures adapted to the different steps could be utilized while at the same time maintaining the materials in liquid phase.

I have discovered that nitriles can be prepared continuously in a series of steps in which temperatures and pressures are maintained for the conversion of fatty acids into amides and the amides into nitriles while maintaining the materials in liquid phase throughout the entire conversion operation. By this process, amides can be produced at relatively low temperature and high pressure, and the conversion to nitriles can be accomplished at relatively low pressures and high temperatures. The stepwise liquid phase reaction has the advantage of driving the reaction to completion in a minimum amount of time, using the least amount of ammonia and avoiding the troublesome carry-over of fatty materials usually present with the known liquid phase batch reactors.

A primary object, therefore, of the present invention is to provide a process in which nitriles may be formed in liquid phase conversion steps in which the temperatures and pressures may be varied for producing amides and finally nitriles at low cost and in a minimum amount of time. A further object is to provide a process in which amides are produced at relatively low temperatures and high pressures and the final conversion to nitriles is accomplished at low pressures and high temperatures while the materials are maintained in liquid phase. A still further object is to provide a stepwise liquid phase nitrile-producing operation in which the reaction is driven to completion in a minimum amount of time, using less ammonia and with less carry-over of fatty materials than in the prior liquid phase batch reactors. Yet a further object is to provide a process useful for the economic production of nitriles from fatty acid materials having very high molecular weight. Other specific objects and advantages will appear as the specification proceeds.

The invention is illustrated in the accompanying drawing by apparatus which may be utilized in carrying out one mode of my process. In the illustration given, fatty acid is pumped by means of the pump 10 into the heater 11 along with a circulating stream of fatty acids and amides issuing from the bottom of the reactor 12 through the pipe 13 and pump 14. The mixture is brought up to a temperature of 170–180° C. in the heater 11 in which the pipe coils may be heated by steam entering through pipe 11a and the resulting heated material is passed through pipe 15 into the reactor 12, where it is distributed into fine streams over the catalyst bed 16. Any suitable dehydrating catalyst such as activated $Al_2O_3$, bauxite ore, aluminum phosphate, silica gel, etc., may be employed.

Superheated $NH_3$ gas in the ratio of about 1.5 mol $NH_3$ to one mol of fatty acid feed is passed through the heater 17, which is preferably a dowtherm superheater, and thence through pipe 18 into the bottom of reactor 12 at 19 and contacts the fatty acid mixture as it descends over the granular catalyst bed. Circulation is maintained through heater 11 at 5 to 20 times the feed rate.

In reactor 12, most of the fatty acid feed which has at least 8 carbon atoms is converted into amide ($RCONH_2$), releasing $H_2O$, which passes out of the top of the converter through line 20 and pressure control valve 21 which is set to maintain the reactor 12 at about 100 p.s.i.g. The amide product passes from the reactor 12 through line 22 into heater 23, where it is mixed with stock from the base of reactor 24 passing through line 25, pump 26 and line 27 into the dowtherm heater 23. In the heater 23, the temperature of the stock is raised to 280–300° C. and the heated material enters reactor 24 through the pipe 28 where it is again contacted with superheated ammonia over a dehydrating catalyst bed 29. The pressure in reactor 24 is maintained at about 30–40 p.s.i.g. by the pressure control valve 30. The ammonia is supplied to the converter at 31. In the reactor 24, 80–90% of the amide and substantially all of the remaining fatty acid is converted to nitrile.

The product leaving reactor 24 passes through line 32 through the dowtherm heater 33, where it is heated together with stock drawn through the base of reactor 34 and passes through conduit 35, pump 36, and conduit 37 to the heater 33. The heated products from heater 33 pass through pipe 38 into the reactor 34, on which the pressure is maintained at about 5–15 p.s.i.g. by the valve 39. The temperature in reactor 34 is increased to 300–320° C.

The nitrile and polymer products, together with trace amounts of fatty acids, leave reactor 34 through conduit 40, and these, together with trace amounts of fatty acid, are flashed to atmospheric pressure in the vessel 41 to release the dissolved ammonia, which passes off through pipe 42 and the crude nitrile product is recovered through conduit 43. The crude nitrile product may be then flash-distilled in a high vacuum continuous still (not shown) over an alkali such as lime or caustic to remove the polymeric material and the last traces of fatty acids.

In the foregoing process, it will be observed that the fatty acid feed is subjected to relatively low temperatures and relatively high pressures to bring about the conversion of the bulk of the fatty acids to amides, the low temperature saving excessive heat and the higher pressures effecting more rapid addition of the required amount of ammonia. In the succeeding converters 24 and 34, lower pressures are employed while still maintaining the liquid products in liquid phase but higher temperatures are used for converting the products into nitriles. Finally, the converted products are flashed at atmospheric pressure to release the dissolved ammonia and the nitriles are recovered.

The process may be utilized with any fatty acid converted product consisting predominantly of amides by utilizing a liquid phase reactor for the final conversion of the amide-fatty acid material to nitriles. For example, a charge consisting of 26.4% of acid and 62.8% of amide was passed over a dehydrating catalyst in liquid phase at a temperature of 280° C. and under a pressure of 60 p.s.i.g., the $NH_3$ rate being 1.54 liters per minute. In 1½ hours, the fatty acid content substantially disappeared. In four hours, the amide content was 3.2 and the nitrile content 93.3.

The same process carried on at a higher temperature of 300° C. resulted in there being substantially no acid present after one hour, and after four hours, the amide content was 0.7 and the nitrile content 88.8.

In a similar operation in which the temperature, however, was maintained at 320° C., the fatty acid content disappeared after about two hours, and after four hours, the amide content was 2.6% and the nitrile 90.2%.

In contrast with the above operations in which pressure was maintained at 60 p.s.i.g., a conversion operation was carried on at a pressure of 5–10 p.s.i.g. at a temperature of 300° C., with a $NH_3$ rate of 1.54 l/min. A test after two hours showed no fatty acid, an amide content of 4.7 and a nitrile content of 89.4%. After four hours, the amide content was 1.4% and the nitrile content 96.3%

A comparison of the foregoing tests indicated that better conversion to nitriles was obtained at the lower pressure. It is possible that this result may be attributed to more rapid and more effective removal of water.

While I prefer to employ a dehydration catalyst in the reactors 12, 24 and 34, the process may be operated effectively without such catalyst, using instead suitable packing such as Raschig rings, Berl saddles, Hexahelix packing, Lessing rings, Nielson propeller packing, prismic packing, Hechenbleikner blocks, partition rings and the like. Such packing may be used in all three reactors or only in the first two reactors while dehydration catalyst is used in the final reactor 34.

Specific examples illustrative of the process may be set out as follows:

*Example I*

In apparatus as shown in the drawing, tallow fatty acid having a molecular weight of 273 was fed at the rate of 278 kilograms per hour, equivalent to one kilogram mol per hour, to the first reactor, as shown in the drawing. The temperature was held at 180° C. and a pressure of 5 kilograms per square centimeter. Two kilogram mols of ammonia were fed to the reactor. The discharge from the first reactor showed a percent free fatty acid of 15.8, 39.2 percent amide, and 45 percent nitrile. This was fed to reactor 24 and the temperature held at 300° C., 1.2 kilograms per square centimeter pressure, with an ammonia flow rate of 1.0 mol of ammonia per hour. The discharge from this reactor had a composition of 4.4 percent fatty acid, 11 percent amide, and 84.6 percent nitrile. The material was then fed to the third reactor where the temperature was 310° C. and zero pressure, and the ammonia rate was 0.5 mole per hour. The final product discharged from this reactor showed a composition of 1 percent fatty acid, 3.6 percent amide, and 95.4 percent nitrile. This material was then distilled at reduced pressure and produced a product having 0.25 percent fatty acid and 1.5 percent amide. The total ammonia used in the entire operation was 3.58 kilogram mols of ammonia per mol of fatty acid feed.

*Example II*

In the same apparatus described in Example I, hydrogenated tallow fatty acid was fed at the rate of 282 kilograms per hour (or 1.02 mols per hour) at a temperature of 180° C. to reactor 12 where the pressure was maintained at 5 kilograms per square centimeter, and the ammonia flow 2.03 mols per hour. The discharge from the reactor showed a composition of 13.5 percent fatty acid, 50 percent amide, and 36.4 percent nitrile. This was fed into reactor 24 in which the temperature was maintained at 300° C. and a pressure of 1.2 kilograms per square centimeter, with an ammonia flow of 1.0 kilogram mol per hour. The product issuing from this reactor had an analysis of 2.6 percent fatty acid, 11.8 percent amide, and 85.6 percent nitrile. The material from reactor 24 was fed to reactor 34 in which the temperature was maintained at 310° C. and at about zero pressure, with an ammonia rate of 0.58. The product from this reactor has a composition of 0.5 percent fatty acid, 4.1 percent amide, and 95.4 percent nitrile. Upon distillation under reduced pressure there was produced a nitrile product having a percent fatty acid of 0.8 and an amide content of 1.2.

The color of the products obtained in Examples I and II was determined in accordance with the procedure described in Henry A. Gardner's manual entitled "Physical and Chemical Examination of Paints, Varnishes, Lacquers and Colors," these being Lovibond values taken from 5¼ inches of product which are set out below. In comparison therewith also are set out the colors of the product obtained in typical vapor phase processes, such as, for example, that shown in Potts et al. Patent No. 2,808,426.

| Product | Initial Color | One Week Color |
| --- | --- | --- |
| Vapor phase | 0.4R–6.5Y | 2.3R–18.0Y. |
| Liquid phase | 0.1R–0.6Y | 0.5R–10.0Y. |

With respect to odor, the products obtained in Examples I and II had an oily but no burnt odor in contrast with the products obtained in the vapor phase process which were oily with a burnt and pungent odor.

*Example III*

The process was carried out as described in Example I except that no dehydration catalyst was used in the reactors. Instead, the reactors were filled with Raschig rings. The results were successful and similar to those obtained in Example I.

*Example IV*

The process was carried out as described in Example I except that the first two reactors contained no dehydration catalyst and instead were provided with Raschig rings while dehydration catalyst was employed in the final reactor 34. The results were comparable to those obtained in Example I.

In comparison with a typical vapor phase process, for example, as described in Potts et al. Patent No. 2,808,426, the present process constitutes and advance in the art in that much less ammonia is required for the production of the nitrile product and lower temperatures are employed.

In the vapor phase process, it is necessary to use a large amount of ammonia in order to vaporize the mixture of fatty acid, amides and nitriles, the ammonia serving the purpose of reducing the partial pressures. Further, additional ammonia is further required in order to strip the pitch of volatile material. In contrast, the present process, by keeping the materials in liquid phase in the third reaction zone, does not require the additional ammonia for vaporizing the material, but instead it is necessary to use only slightly more than a stoichiometric amount of ammonia necessary to convert the remaining free fatty acids to nitrile, this amount in the present process being less than one mole per mol of fatty acid. As indicated in the examples, the average amount of ammonia is about 0.5 mol per mol of fatty acid feed.

A further advantage is that the feed material is treated at lower temperatures not substantially in excess of 300° C. I thereby avoid cracking temperatures which begin at about 320° C., and as a result the product has better initial color and color stability above that obtained by the process in which the final conversion is in vapor phase.

While in the foregoing specification I have set forth a specific process and procedural steps in considerable detail for the purpose of illustrating the invention, it will be understood that such details may be varied widely by those skilled in the art without departing from the spirit of my invention.

I claim:
1. In the stepwise preparation of fatty acid nitrile by reacting fatty acid feed with ammonia in a reaction zone to form a corresponding fatty acid amide and subsequently reacting the fatty acid amide in a second separate and discrete zone with additional ammonia to form a corresponding fatty acid nitrile, the pressure in said reaction zones being maintained at a level for keeping said acid, amide, nitrile, and all intermediate products in liquid phase, the improvement which consists in subjecting said resultant products in a third separate and discrete reaction zone to additional ammonia at about 300° C. and under sufficient pressure to maintain the products in liquid phase, said additional ammonia being introduced into said third reaction zone at about 0.5 mol per mol of fatty acid feed, reducing the pressure to atmospheric pressure to remove the ammonia, and then distilling the liquid product under vacuum to obtain a nitrile product substantially free of impurities.

2. In the stepwise preparation of fatty acid nitrile by reacting fatty acid feed with ammonia in a reaction zone to form a corresponding fatty acid amide and subsequently reacting the fatty acid amide with additional ammonia in a second separate and discrete zone to form a corresponding fatty acid nitrile, the pressure in said reaction zones being maintained at a level for keeping said acid, amide, nitrile, and all intermediate products in liquid phase, the improvement which consists in subjecting said resultant products in a third separate and discrete reaction zone to additional ammonia at about 300° C. and not exceeding 320° C. and under sufficient pressure to maintain the products in liquid phase, said additional ammonia being introduced into said third reaction zone being about 0.5 mol per mol of fatty acid feed, reducing the pressure to atmospheric pressure to remove the ammonia, and then distilling the liquid product under vacuum to obtain a nitrile product substantially free of impurities.

3. A process according to claim 1 in which said reaction are carried out in the presence of a dehydration catalyst.

4. A process according to claim 1 in which the third reaction is carried out in the presence of a dehydration catalyst.

No references cited.

CHARLES B. PARKER, *Primary Examiner.*

JOSEPH P. BRUST, *Assistant Examiner.*